(12) United States Patent
Mueck et al.

(10) Patent No.: US 8,401,105 B2
(45) Date of Patent: Mar. 19, 2013

(54) METHOD FOR TRANSMITTING A DATA SIGNAL IN A MIMO SYSTEM

(75) Inventors: Markus Mueck, Unterhaching (DE); Christian Drewes, Germering (DE); Wen Xu, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 306 days.

(21) Appl. No.: 12/813,169

(22) Filed: Jun. 10, 2010

(65) Prior Publication Data
US 2011/0305284 A1   Dec. 15, 2011

(51) Int. Cl.
H04L 27/28   (2006.01)
H04L 27/00   (2006.01)

(52) U.S. Cl. .................... 375/267; 375/295; 375/316

(58) Field of Classification Search .................. 375/260, 375/295, 316, 267, 261; 714/749, 748, E11.113
See application file for complete search history.

(56) References Cited

U.S. PATENT DOCUMENTS

| | | | |
|---|---|---|---|
| 5,349,589 A * | 9/1994 | Chennakeshu et al. ....... | 714/795 |
| 6,959,065 B2 * | 10/2005 | Sparrman et al. ............ | 376/346 |
| 6,975,692 B2 * | 12/2005 | Razzell ........................ | 375/341 |
| 7,046,740 B2 | 5/2006 | Dowling | |
| 7,051,269 B1 * | 5/2006 | Hindelang et al. ........... | 714/790 |
| 7,545,778 B2 * | 6/2009 | Sugar et al. .................. | 370/335 |
| 7,633,849 B1 * | 12/2009 | Al-Rawi et al. ............... | 370/208 |
| 7,657,233 B2 * | 2/2010 | Becker et al. .................. | 455/69 |
| 7,894,330 B2 * | 2/2011 | Lee et al. ...................... | 370/208 |
| 7,983,366 B2 * | 7/2011 | Talwar et al. ................. | 375/346 |
| 8,050,339 B2 * | 11/2011 | Wang et al. ................... | 375/260 |
| 8,077,785 B1 * | 12/2011 | Lee et al. ...................... | 375/260 |
| 2004/0028148 A1 * | 2/2004 | Dowling ....................... | 375/296 |
| 2004/0063399 A1 * | 4/2004 | Milbar ......................... | 455/3.01 |
| 2007/0058595 A1 * | 3/2007 | Classon et al. ................ | 370/337 |
| 2008/0025420 A1 * | 1/2008 | Liu et al. ....................... | 375/260 |
| 2008/0198941 A1 * | 8/2008 | Song et al. .................... | 375/260 |
| 2008/0209305 A1 * | 8/2008 | Sato .............................. | 714/790 |
| 2008/0219366 A1 * | 9/2008 | Lau et al. ...................... | 375/260 |
| 2008/0267310 A1 * | 10/2008 | Khan et al. .................... | 375/267 |
| 2008/0270866 A1 * | 10/2008 | Choi et al. .................... | 714/748 |
| 2009/0046571 A1 * | 2/2009 | Safar ............................. | 370/210 |
| 2009/0122854 A1 * | 5/2009 | Zhu et al. ...................... | 375/232 |
| 2009/0245222 A1 * | 10/2009 | Sampath et al. .............. | 370/343 |
| 2009/0262855 A1 * | 10/2009 | Lee et al. ...................... | 375/267 |

(Continued)

OTHER PUBLICATIONS

Nabar, R.U., "Transmit Optimization for Spatial Multiplexing in the Presence of Spatial Fading Correlation", IEEE Global Telecommunications Conference, 2001. GLOBECOM '01.*

(Continued)

Primary Examiner — David C. Payne
Assistant Examiner — Bahman Badipour
(74) Attorney, Agent, or Firm — Eschweiler & Associates, LLC

(57) ABSTRACT

A method for transmitting a data signal by a transmission unit of a wireless multiple-input/multiple-output (MIMO) communication system. The communication system includes the transmission unit and a reception unit, the transmission unit having a plurality of transmission antennas and the reception unit having a plurality of reception antennas. The method includes performing a first transmission of a data signal, the first transmission including transmitting the data signal by each one of the plurality of transmission antennas, and performing a second transmission of the data signal at a time later than the first transmission, the second transmission including transmitting at least one spectrally modified signal variant of the data signal by at least one antenna of the plurality of transmission antennas.

23 Claims, 7 Drawing Sheets

U.S. PATENT DOCUMENTS

| | | | |
|---|---|---|---|
| 2009/0274037 A1* | 11/2009 | Lee et al. | 370/208 |
| 2009/0276679 A1* | 11/2009 | Prasad et al. | 714/751 |
| 2009/0279626 A1* | 11/2009 | Wang | 375/260 |
| 2010/0005357 A1* | 1/2010 | Sun et al. | 714/749 |
| 2010/0034300 A1* | 2/2010 | Xiang et al. | 375/260 |
| 2010/0246718 A1* | 9/2010 | Orlik et al. | 375/303 |
| 2010/0290438 A1* | 11/2010 | Seok et al. | 370/335 |
| 2010/0303004 A1* | 12/2010 | Mueck et al. | 370/328 |
| 2011/0007790 A1* | 1/2011 | Xu et al. | 375/225 |
| 2011/0019768 A1* | 1/2011 | Nammi et al. | 375/295 |
| 2011/0022918 A1* | 1/2011 | Kwon et al. | 714/748 |
| 2011/0033010 A1* | 2/2011 | Kwon et al. | 375/296 |
| 2011/0058598 A1* | 3/2011 | Gaur | 375/233 |
| 2011/0090825 A1* | 4/2011 | Papasakellariou et al. | 370/280 |
| 2011/0107169 A1* | 5/2011 | Lohr et al. | 714/748 |
| 2011/0138258 A1* | 6/2011 | Okamura et al. | 714/780 |
| 2011/0200144 A1* | 8/2011 | Adler et al. | 375/316 |
| 2011/0201297 A1* | 8/2011 | Adler et al. | 455/334 |
| 2011/0211522 A1* | 9/2011 | Chung et al. | 370/315 |
| 2011/0211651 A1* | 9/2011 | Khojastepour | 375/295 |
| 2011/0246846 A1* | 10/2011 | Ojala et al. | 714/748 |
| 2011/0302475 A1* | 12/2011 | Eisenhuth et al. | 714/763 |
| 2011/0317722 A1* | 12/2011 | Gaddam et al. | 370/474 |
| 2012/0063438 A1* | 3/2012 | Kang et al. | 370/338 |

OTHER PUBLICATIONS

Noordin, N. K. et al., "Space-time and space frequency OFDM with Convolutional Precoding Over Fading Channels", TENCON 2008, IEEE Region 10 Conference, Nov. 19-21, 2008, pp. 1-6.

Wie Yu, et al., "Trellis and Convolutional Precoding for Transmitter-Based Interference Presubtraction", Communications IEEE Transactions on vol. 53, Issue 7, Jul. 2005, pp. 1220-1230.

* cited by examiner

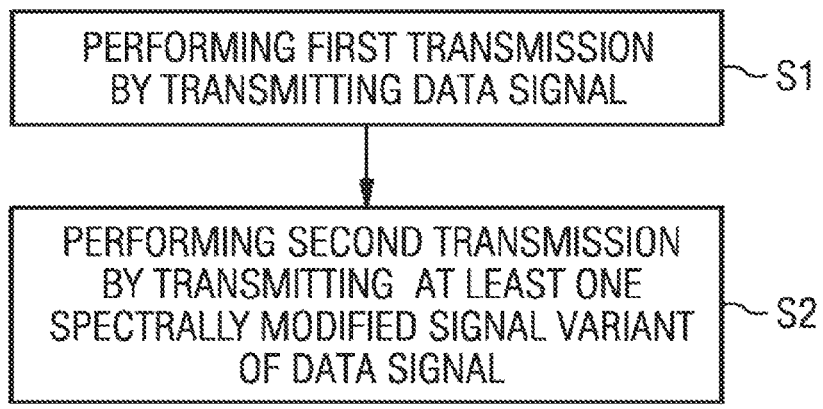
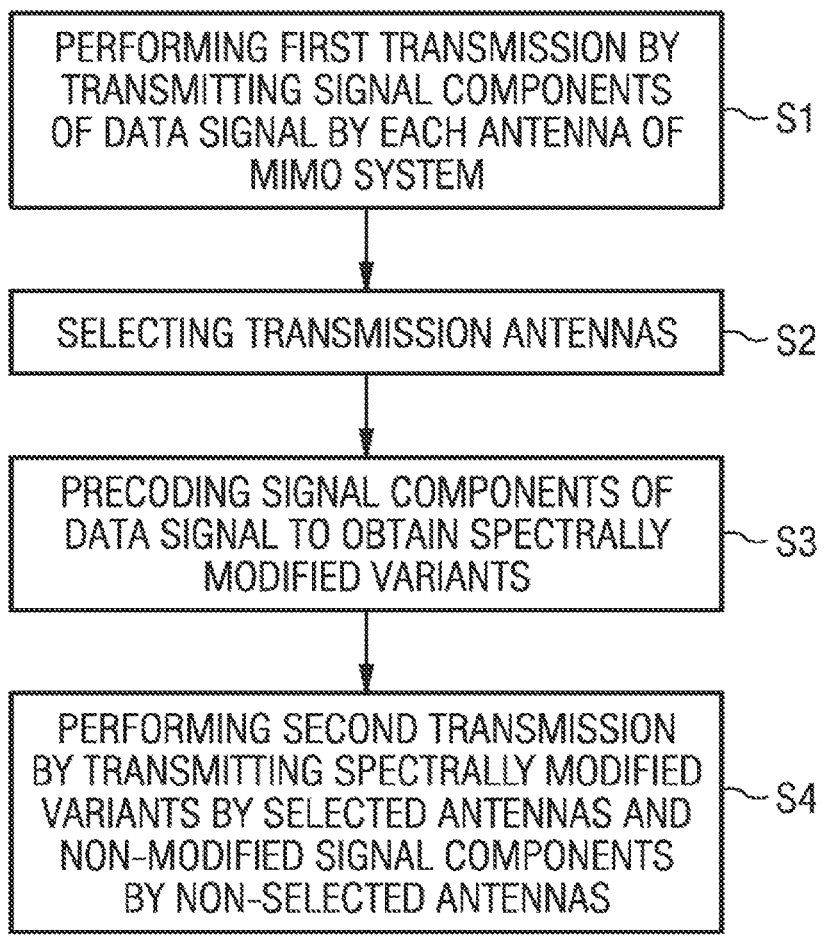

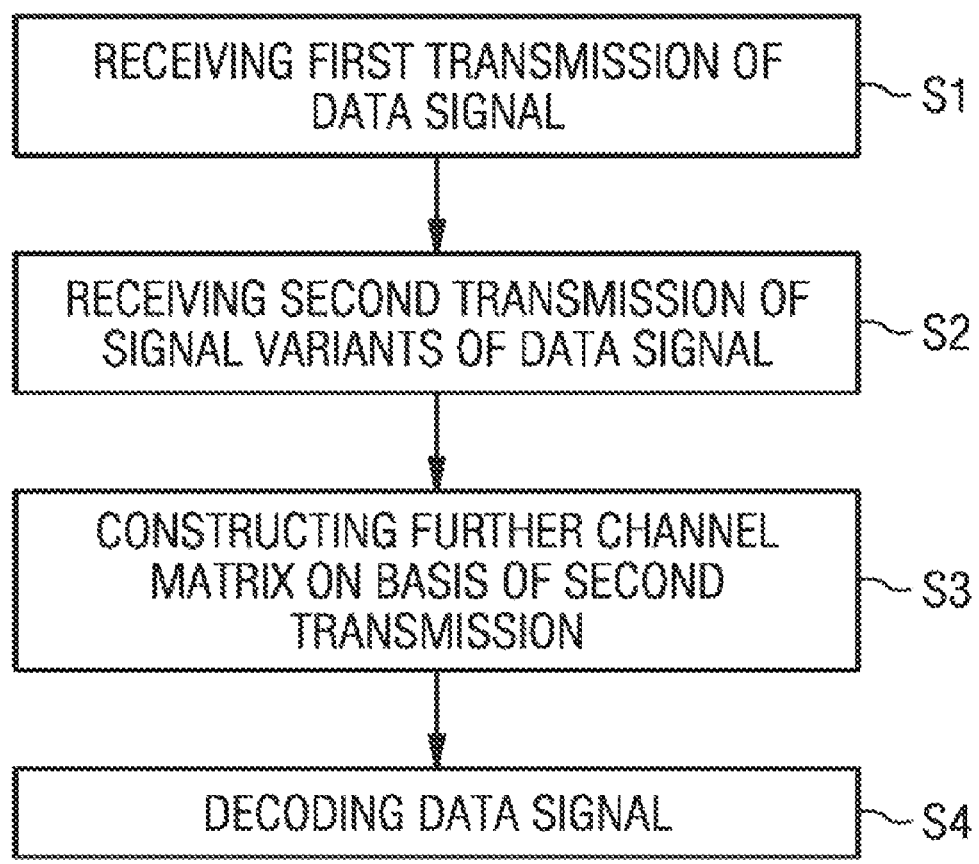

FIG 4
FIRST TRANSMISSION
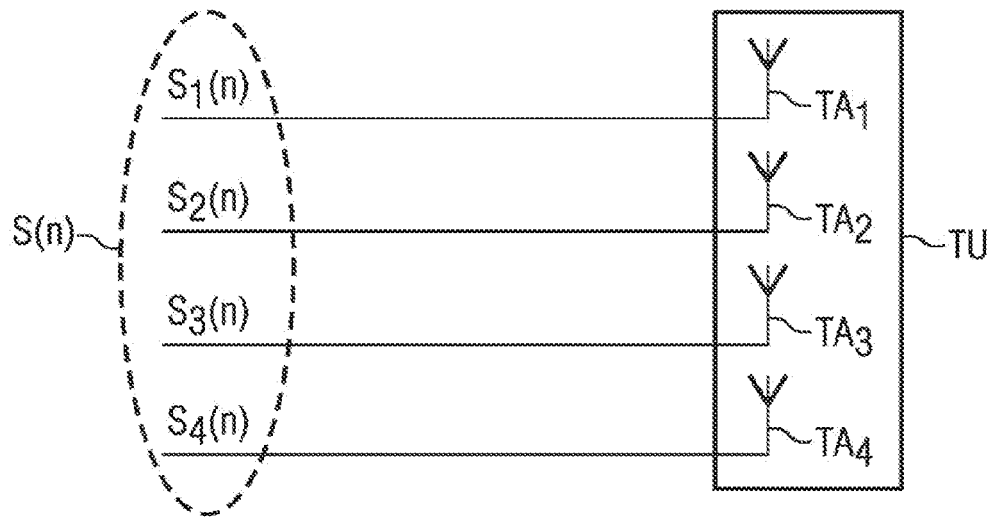
SECOND TRANSMISSION
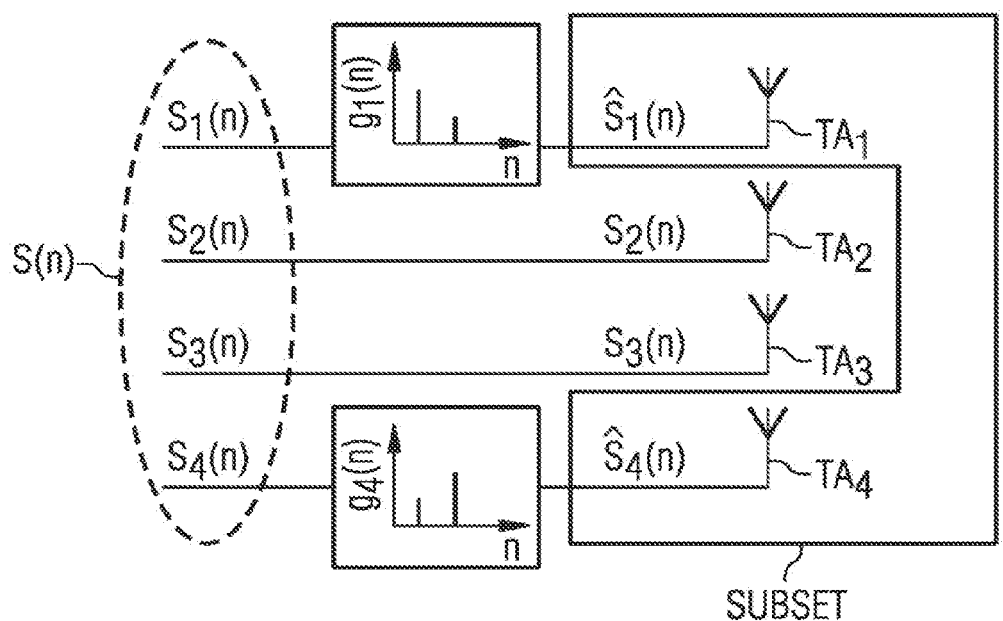

FIG 5
FIRST TRANSMISSION
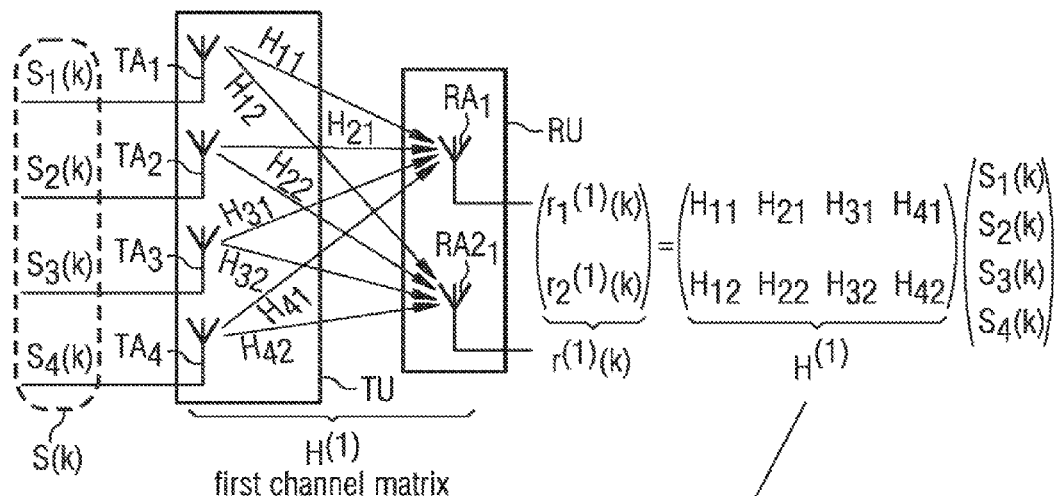
COMBINATION
SECOND TRANSMISSION
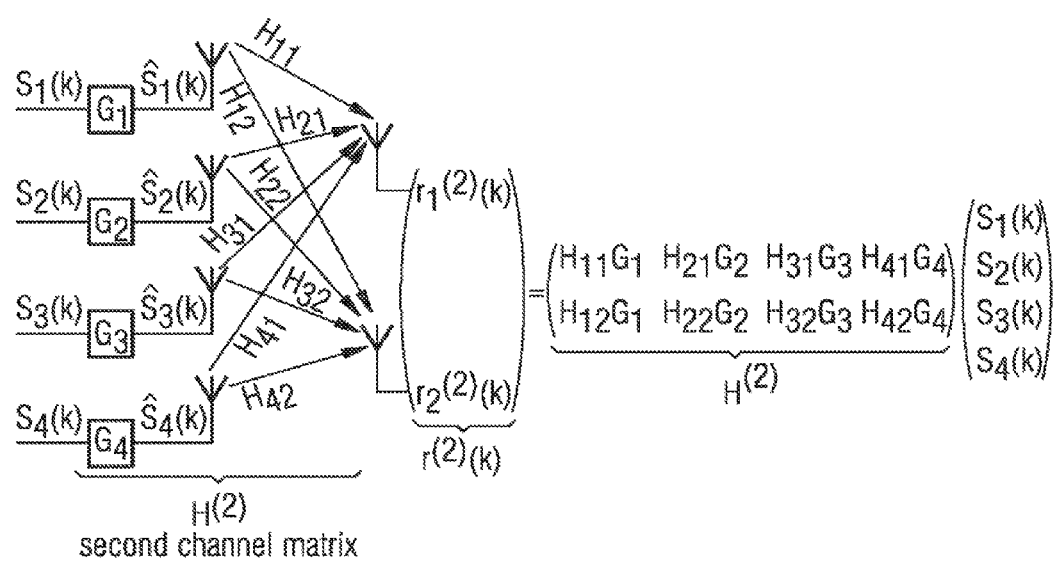

METHOD FOR TRANSMITTING A DATA SIGNAL IN A MIMO SYSTEM

FIELD

The present invention relates to a method for transmitting a data signal in a wireless multiple-input/multiple-output (MIMO) communication system, a method of receiving a data signal in a MIMO communication system, a transmission unit to transmit a data signal in a MIMO communication system, and a reception unit to receive a data signal in a MIMO communication system.

BACKGROUND

Radio communication performance can be increased by use of multiple antennas and multiple-input/multiple-output (MIMO) techniques. The data throughput and link range can be increased by employing MIMO techniques without additional bandwidth or transmit power. In such MIMO systems, spatial division multiplexing (SDM) is one technique used in which different spatial streams of data are sent from each transmit antenna. Since these streams carry different data, the overall data rate of the system is increased. A further improvement of the radio communication performance is to be expected when combining the above techniques with multi-carrier transmission and reception methods like, for example, the well-known orthogonal frequency division multiplex (OFDM) transmission and reception techniques.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

FIG. 1 shows a flow diagram of a method for transmitting a data signal in a MIMO communication system according to an embodiment;

FIG. 2 shows a flow diagram of a method for transmitting a data signal in a MIMO communication system according to an embodiment;

FIG. 3 shows a flow diagram of a method for receiving a data signal in a MIMO communication system according to an embodiment;

FIG. 4 shows a schematic block representation of a wireless MIMO system performing an embodiment of a method as depicted in FIG. 1 or 2.

FIG. 5 shows a schematic block representation of a wireless MIMO system performing an embodiment of the method depicted in FIG. 3.

DETAILED DESCRIPTION

Figure 6:
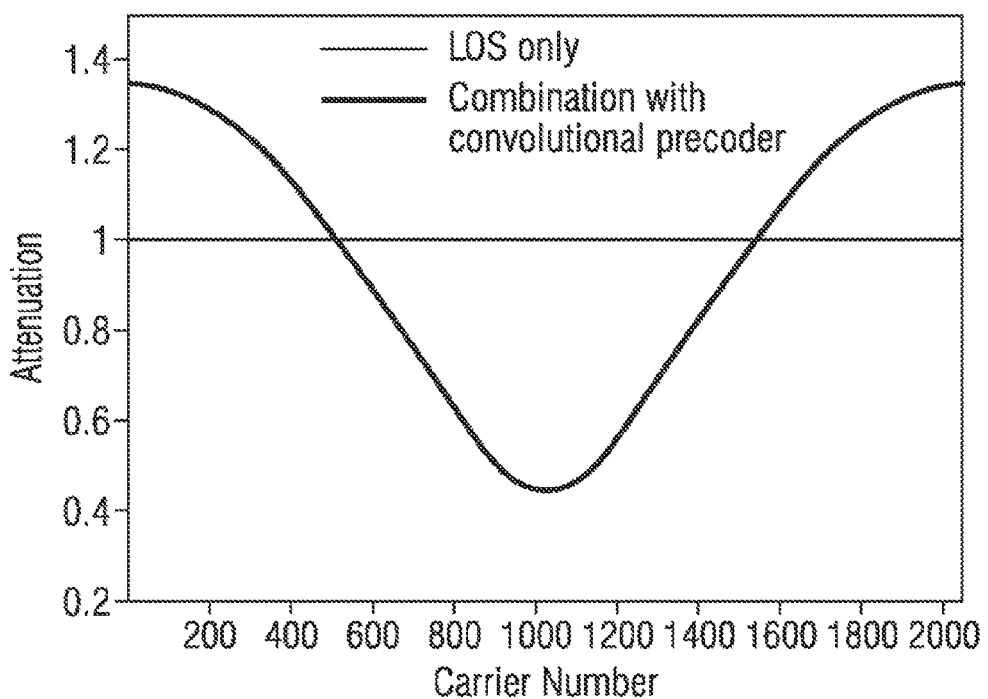
FIG. 6 shows a diagram to illustrate the introduction of frequency diversity with the second transmission.

The aspects and embodiments are described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless of whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The apparatuses and methods as described herein are utilized as part of and for radio transmission systems, in particular for systems operating in the Orthogonal Frequency Division Multiplex (OFDM) mode. The apparatuses disclosed may be embodied in baseband segments of devices used for the transmission or reception of data signals such as e.g. OFDM radio signals, in particular transmitters like base stations or relay stations and receivers like mobile phones, handheld devices or other kinds of mobile radio receivers. The described apparatuses may be employed to perform methods as disclosed herein, although those methods may be performed in any other way as well.

An OFDM communication link may be operable with an amount of N sub-carriers with N being 2048, for example. Sub-carriers of such OFDM transmission systems may comprise a single frequency each. They may also comprise a plurality of frequencies, for example, adjoining frequencies in a frequency range or any arbitrary sub-set of frequencies. The number of frequencies included in a sub-carrier may, in particular, not be limited to any number of frequencies.

The methods and units as described herein are utilized within Multiple-Input/Multiple-Output (MIMO) systems. These systems can be set-up having one transmission unit and one reception unit, both units comprising more than one transmission or reception antenna, respectively.

Referring to FIG. 1, there is shown a flow diagram of a method for transmitting a data signal, in particular an orthogonal frequency division multiplex (OFDM) signal according to an embodiment. The method is performed by and within a transmission unit of a wireless multiple-input/multiple-output (MIMO) communication system, the communication system comprising the transmission unit and a reception unit, the transmission unit comprising a plurality of transmission antennas and the reception unit comprising a plurality of reception antennas. The method comprises performing a first transmission of a data signal, the first transmission comprising transmitting the data signal by each one of the plurality of the transmission antennas at s1, and performing a second transmission of the data signal at a time later than the first transmission, the second transmission comprising transmitting at least one spectrally modified signal variant of the data signal by at least one antenna of the plurality of transmission antennas at s2.

The data signal may be an electrical or optical signal carrying a message or an information. It may be a user signal, or a payload signal transporting the information in the form of bits. The information bits may be modulated onto the data signal by a modulator. The modulator may be single-carrier modulator, e.g. a QAM modulator or a PSK modulator. The modulator may be a multi-carrier modulator, e.g. an OFDM modulator, a wavelet modulator or a DMT modulator.

An OFDM modulator according to an embodiment receives high rate information which is split onto N rate sub-carriers. The data is therefore transmitted by blocks of size N: $x(n)=[x_1(n), x_2(n), x_k(n), \ldots, x_N(n)]$, where the index n is the block OFDM symbol number and the subscript k is for the carrier index. The block OFDM symbols are coded by an inverse FFT (Fast Fourier Transformation) matrix to yield the so-called time domain block vector $s(n)=[s_1(n), s_2(n), s_k(n), \ldots, s_N(n)]$. At the output of the inverse FFT, a guard interval (cyclic prefix) of D samples is inserted at the beginning of each block $[s_{N-D+1}(n), \ldots, s_N(n), s_k(n), s_i(n), \ldots, s_N(n)]$. It may consist of a cyclic extension of the time domain OFDM symbol of size larger than the channel impulse response $(D>L-1)$. The cyclic prefix is appended between each block in order to transform the multi-path linear convolution into a circular one. After Parallel to Serial conversion the data signal, in particular the OFDM signal, is provided by the OFDM modulator in a discrete-time representation. A pre-coding according to an embodiment may be applied to the data signal in order to modify its spectral characteristics. The pre-coded data signal may be converted from digital to analog and sent through the communications channel to the receiver.

At the receiver, symmetrical operations are performed, i.e for an OFDM receiver down conversion and Analog to Digital Conversion to obtain the discrete time received signal $r^{CP}(n)=[r_{N-D+1}(n), \ldots, r_N(n), r_1(n), r_k(n), \ldots, r_N(n)]$. In order to suppress inter-block interference, the first D samples (cyclic prefix or guard interval suppression) of the received signal $r^{CP}(n)$ are discarded and the resulting received signal $r(n)=[r_1(n), r_k(n), \ldots, r_N(n)]$ is processed by Fast Fourier Transformation to yield the transmitted data signal y(n) which corresponds to the original data signal x(n) multiplied by the channel matrix H(n) plus a noise term.

According to an embodiment the data signal is an OFDM signal. According to an embodiment the data signal comprises a plurality of signal components, each signal component being spectrally modified to obtain a respective spectrally modified signal variant of the data signal. According to an embodiment the spectrally modified signal variant of the data signal is obtained by applying a convolutional coding to a respective signal component of the data signal, the convolutional coding being represented by a convolutional sequence. The convolutional coding with a convolutional sequence represents a pre-coding with a pre-coding sequence.

Referring to FIG. 2, there is shown a flow diagram of a method for transmitting a data signal, in particular an orthogonal frequency division multiplex (OFDM) signal according to an embodiment. The method is performed by and within a transmission unit of a wireless multiple-input/multiple-output (MIMO) communication system, the communication system comprising the transmission unit and a reception unit, the transmission unit comprising a plurality of transmission antennas and the reception unit comprising a plurality of reception antennas. The method comprises performing a first transmission of the data signal comprising a plurality of signal components by the plurality of transmission antennas, each transmission antenna transmitting a respective signal component of the data signal at S1. The method further comprises selecting a subset of the plurality of transmission antennas to obtain selected transmission antennas which are transmission antennas belonging to the subset of the plurality of transmission antennas and to obtain non-selected transmission antennas which are transmission antennas not belonging to the subset of the plurality of transmission antennas at S2. The method also includes pre-coding each of the signal components of the data signal transmitted by the selected transmission antennas with a respective pre-coding sequence to obtain spectrally modified variants of the signal components of the data signal at S3 and performing a second transmission of the data signal at a time later than the first transmission, the second transmission comprising transmitting by the selected transmission antennas the spectrally modified variants of the signal components of the data signal and re-transmitting by the non-selected transmission antennas the signal components of the data signal transmitted by the non-selected transmission antennas at S4.

According to another embodiment the spectrally modified signal variants of the signal components of the data signal are transmitted by each of the transmission antennas. Thus, no selecting of transmission antennas is required and the method reduces to the two steps of performing a first transmission of signal components of the data signal at S1 and performing a second transmission of spectrally modified signal variants of the signal components of the data signal at a time later than the first transmission at S2.

The spectrally modified variant of the signal component of the data signal to be transmitted from one transmission antenna of the plurality of transmission antennas is obtained by pre-coding the respective signal component of the data signal with a pre-coding sequence according to an embodiment. The pre-coding sequence may be a convolution sequence. The convolution sequence may be applied to the respective signal component by a mathematical convolution operation which is a time-domain operation. Alternatively, the pre-coding may be performed in the frequency domain by applying a frequency-dependent multiplication to the respective signal component of the data signal which is frequency-transformed. A frequency transformation of the respective signal components and/or the pre-coding sequences may be performed by using a Fourier transformation, e.g. a Fast Fourier Transformation (FFT). The convolution operation may be realized as a delay when the convolution sequence has a single value at a time unequal to zero. The data signal comprises a plurality of signal components, each signal component may be provided at a different one of the transmission antennas such that the data signal is transmitted by transmission of its signal components by each of the transmission antennas.

In this application the second transmission will also be called a retransmission. If it happens that the method comprises a second transmission and a third transmission, the second transmission will also be called the first retransmission and the third transmission will also be called the second retransmission.

In order to enhance the reliability of a MIMO link, the technique of spatial division multiplexing (SDM) is a technique most often associated with MIMO. Rather than increasing range, SDM sends different spatial streams of data from each transmission antenna. Since these streams carry different data, the overall data rate of the system is increased. The present invention mainly aims to increase the performance of the SDM approach. SDM schemes require well-conditioned full-rank channel matrices. In particular for high-order antenna systems, this condition is often not fulfilled in conventional approaches. The invention according to the embodiment as shown in FIGS. 1 and 2 proposes a solution for the general problem of applying SDM to higher order MIMO systems.

According to FIGS. 1 and 2, the first transmission is performed without any pre-coding. An essential idea of the method includes introducing "artificial" time domain convolutions, namely the respective pre-coding (i.e. convolution) sequences to be transmitted in the second transmission of the signal. Such a time domain convolution sequence is expected to increase the frequency diversity in the second transmission and will thus help to ensure a more reliable communication.

According to an embodiment of the method of FIG. 1 or 2, the first transmission is represented by a first channel matrix and the second transmission is represented by a second channel matrix, and the method further comprises selecting the pre-coding sequences, such that a further channel matrix can be constructed on the basis of the second channel matrix, the further channel matrix comprising a rank which is higher than the rank of the first channel matrix. According to an embodiment the first channel matrix is rank-deficient. The rank of an m×n matrix is at most min(n,m). A matrix that has a rank as large as possible is said to have full rank; otherwise, the matrix is rank-deficient. According to a further embodiment the first channel matrix is quasi rank-deficient, i.e. at least one eigenvalue of the first channel matrix is close or very close to zero but not exactly zero. According to the embodiments above the first channel matrix is poorly conditioned. A poorly conditioned matrix is a matrix which is quasi rank-deficient or even rank-deficient. In the case of quasi rank-deficient first channel matrices the same problems arise as for rank-deficient matrices which problems may be solved by embodiments of the invention as described in the instant application.

According to an embodiment of the method of FIG. 1 or 2, during the second transmission each one of the plurality of transmission antennas transmits a spectrally modified variant of a signal component of the data signal. According to an embodiment thereof, the spectrally modified variants of different antennas are different from each other. According to an embodiment some of the convolution sequences may have only one single element such that a respective spectrally modified variant of a signal component of the data signal corresponds to the signal component of the data signal or to an amplified version thereof.

According to an embodiment of the method of FIG. 1 or 2, spectrally modified signal variants may be transmitted by one antenna of the plurality of antennas, all antennas of the plurality of antennas, or any number of antennas between one and all of the plurality of antennas. According to an embodiment at least two of the transmission antennas have a different polarization, e.g. vertical or horizontal polarization.

According to an embodiment of the method of FIG. 1 or 2, the length (duration) of the pre-coding sequences is shorter than an OFDM guard interval. For example, the length may be 1, 2 or 3 samples. According to an embodiment the length of the pre-coding sequences is shorter than a length of a channel impulse response of the MIMO communication system, in particular shorter than a length of a channel impulse response between the plurality of transmission antennas and the plurality of reception antennas.

According to an embodiment of the method of FIG. 1 or 2, the second transmission is initiated upon receipt of an information that the transmitted OFDM signal could not be correctly decoded in a reception unit on the basis of the first transmission. According to an embodiment a hybrid automatic repeat request procedure is used for initiating re-transmission.

According to an embodiment of the methods of FIG. 1 or 2, the method further comprises performing a third transmission of the data signal, in particular the OFDM signal at a time later than the second transmission, the third transmission comprising transmitting spectrally modified signal variants of the data signal. According to an embodiment thereof, the third transmission is initiated upon receipt of an information that the transmitted data signal could not be correctly decoded in a reception unit on the basis of the first and second transmissions. According to a further embodiment thereof, the third transmission is similar or equal to the second transmission. According to an alternative embodiment, the third transmission is different to the second transmission, wherein in particular the spectrally modified signal variants of the third transmission are obtained by frequency shifting the spectrally modified signal variants of the second transmission. In particular the spectrally modified signal variants of the third transmission can be obtained by applying a linear phase in the time domain to each sample value of the spectrally modified signal variants of the second transmission by multiplying each sample value by $e^{j\alpha n}$, where $\alpha$ is a complex constant and n is the sample number, wherein $\alpha$ can be equal to $\pi$.

According to an embodiment of the method of FIG. 2 the spectrally modified signal variants of signal components of the data signal of the third transmission are obtained by selecting a different subset of transmission antennas for transmission of the spectrally modified signal variants for the third transmission with respect to the subset selected for the second transmission.

According to an embodiment of the method of FIG. 1 or 2, the transmission unit comprises a plurality of stored pre-coders, wherein each pre-coder comprises information on spectrally modified signal variants of a second or third transmission, the method further comprising accidentally selecting one of the plurality of stored pre-coders for performing the second or third transmission.

According to an embodiment of the method of FIG. 1 or 2, the transmission unit comprises a plurality of stored pre-coders, wherein each pre-coder comprises information on spectrally modified signal variants of a second or third transmission, the method further comprising specifically selecting one particular pre-coding (convolutional) sequence out of the plurality of stored pre-coding (convolutional) sequences for performing the second or third transmission.

Referring to FIG. 3, there is shown a flow diagram of a method for receiving a data signal, in particular an orthogonal frequency division multiplex (OFDM) signal by a reception unit of a wireless multiple-input/multiple-output (MIMO) communication system, the communication system comprising the reception unit and a transmission unit, the transmission unit comprising a plurality of transmission antennas and the reception unit comprising a plurality of reception antennas. The method comprises receiving a first transmission of a data signal, the first transmission being represented by a first channel matrix at s1, and receiving a second transmission of the data signal at a time later than the first transmission, the second transmission comprising spectrally modified signal variants of signal components of the data signal and being represented by a second channel matrix at s2. The method of FIG. 3 further comprise constructing a further channel matrix on the basis of the second channel matrix, the further channel matrix comprising a rank which is higher than a rank of the first channel matrix at s3, and decoding the transmitted data signal by means of the further channel matrix at s4.

According to an embodiment of the method of FIG. 3, the method further comprises requesting the second transmission after detecting that the transmitted data signal can not be correctly decoded on the basis of the first transmission. The detecting, for example, can be done by standard error-detection processes in which error-detection information bits are added to data to be transmitted. A standard procedure is the well-known cyclic redundancy check (CRC). In the case of detection of an error, a request for a repeated transmission is automatically generated, the procedure is thus called automatic repeat request (ARQ). In a further variant thereof, which is called hybrid ARQ (HARQ), forward error correction (FEC) bits are also added to the existing error detection bits.

According to an embodiment of the method of FIG. 3, the method further comprises constructing the further channel matrix on the basis of the first channel matrix and the second channel matrix.

Referring to FIG. 4, there is shown a schematic block representation of a wireless MIMO system performing an embodiment of the method depicted in FIG. 1 or 2. A data signal s(n) comprises a plurality of signal components $s_1(n)$, $s_2(n)$, $s_3(n)$ and $s_4(n)$. During a first transmission each of the signal components $s_1(n)$, $s_2(n)$, $s_3(n)$ and $s_4(n)$ is transmitted by a respective transmission antenna $TA_1$, $TA_2$, $TA_3$ and $TA_4$ of a transmission unit TU of a wireless MIMO communication system. For the second transmission a subset (SUBSET) of the plurality of transmission antennas $TA_1$, $TA_2$, $TA_3$ and $TA_4$ is selected to obtain selected transmission antennas ($TA_1$, $TA_4$) which belong to the subset and to obtain non-selected antennas ($TA_2$, $TA_3$) which do not belong to the subset. Each of the signal components $s_1(n)$ and $s_4(n)$ of the data signal s(n) transmitted by the selected transmission antennas ($TA_1$, $TA_4$) are pre-coded with a respective pre-coding sequence ($g_1(n)$, $g_4(n)$) to obtain spectrally modified variants ($\hat{s}_1(n)$, $\hat{s}_4(n)$) of the signal components of the data signal s(n). The second transmission is performed at a time later than the first transmission and comprises transmitting by the selected transmission antennas ($TA_1$, $TA_4$) the spectrally modified variants ($\hat{s}_1(n)$, $\hat{s}_4(n)$) of the signal components of the data signal s(n) and re-transmitting by the non-selected transmission antennas ($TA_2$, $TA_3$) the signal components ($s_2(n)$, $s_3(n)$) of the data signal s(n) transmitted by the non-selected transmission antennas ($TA_2$, $TA_3$) during the first transmission.

Referring to FIG. 5, there is shown a schematic block representation of a wireless MIMO system performing an embodiment of the methods depicted in FIGS. 1, 2 and 3. A data signal s(k) represented in frequency domain by the index k comprises a plurality of signal components $s_1(k)$, $s_2(k)$, $s_3(k)$ and $s_4(k)$. During a first transmission which is designated by the superscript notation (1) each of the signal components $s_1(k), s_2(k), s_3(k)$ and $s_4(k)$ is transmitted by a respective transmission antenna $TA_1$, $TA_2$, $TA_3$ and $TA_4$ of a transmission unit TU of a wireless MIMO communication system. A reception unit RU of the MIMO communication system comprising a plurality of reception antennas $RA_1$, $RA_2$ receives the transmitted signal components $s_1(k)$, $s_2(k)$, $s_3(k)$ and $s_4(k)$ as a plurality of received signal components $r_1^{(1)}(k)$, $r_2^{(1)}(k)$ of a received signal $r^{(1)}(k)$. Each received signal component $r_i^{(1)}(k)$ depends on the transmitted signal component $s_j(k)$ by the respective channel path (channel impulse response) $H_{ji}$. The relation can be written as $r_i^{(1)}(k) = H_{ji} s_j(k)$. The index j specifies the transmission antenna $TX_j$ and the index i specifies the reception antenna $RX_i$ of the respective transmission path. The plurality of individual channel impulse responses $H_{ji}$ may be represented as a single matrix $H^{(1)}$ which is designated as the first channel matrix.

During a second transmission (2) at a time later than the first transmission (1) spectrally modified variants $\hat{s}_1(k)$, $\hat{s}_2(k)$, $\hat{s}_3(k)$, $\hat{s}_4(k)$ of the signal components $s_1(k)$, $s_2(k)$, $s_3(k)$, $s_4(k)$ of the data signal s(k) are transmitted by a respective transmission antenna $TA_1$, $TA_2$, $TA_3$ and $TA_4$ of the transmission unit TU of the wireless MIMO communication system. The reception unit RU of the MIMO communication system receives the transmitted spectrally modified variants of the signal components $s_1(k)$, $s_2(k)$, $s_3(k)$ and $s_4(k)$ as a plurality of received signal components $r_1^{(2)}(k)$, $r_2^{(2)}(k)$ of a received signal $r^{(2)}(k)$. Each received signal component $r_i^{(2)}(k)$ depends on the respective spectrally modified variant $\hat{s}_j(k)$ by the respective channel path (channel impulse response) $H_{ji}$. Each spectrally modified variant $\hat{s}_j(k)$ depends on the respective signal component $s_j(k)$ of the data signal s(k) by the respective pre-coder $G_j$ which is the frequency representation of the pre-coding sequence $g_j(n)$. The relation can be written as $\hat{s}_j(k) = G_j s_j(k)$ and as $r_i^{(2)}(k) = H_{ji} \hat{s}_j(k)$. The plurality of individual channel impulse responses $H_{ji}$ and the plurality of individual pre-coders $G_j$ may be represented as a single matrix $H^{(2)}$ which is designated as the second channel matrix. According to one embodiment described not each of the transmission antennas $TX_j$ may transmit a spectrally modified variant $\hat{s}_j(k)$ of a signal component $s_j(k)$ of the data signal s(k), some of the transmission antennas $TX_j$ may transmit an original signal component $s_j(k)$ of the data signal s(k).

A further channel matrix H(*) may be constructed on the basis of the second channel matrix $H^{(2)}$ by a combination of the first channel matrix $H^{(1)}$ and the second channel matrix $H^{(2)}$. FIG. 5 depicts one possible way of combining both matrices. The first received signal component $r_1^{(1)}(k)$ of the first transmission which is received by the first antenna is added to the first received signal component $r_i^{(2)}(k)$ of the second transmission which is received by the first antenna to receive a first received signal. A second received signal is constructed as the second received signal component $r_2^{(1)}(k)$ of the first transmission which is received by the second antenna. This combination results in a further channel matrix H(*) having a rank which may be controlled by adequate adjusting the pre-coders $G_j$. For example the adjustment may be used for obtaining a full rank or a maximum rank further channel matrix H(*).

According to an embodiment as depicted in FIG. 3 or 5, a method for constructing a well-conditioned further channel matrix from a poorly conditioned first channel matrix and parts of a second poorly conditioned channel matrix comprises constructing a first channel matrix on the basis of received samples of a data signal comprising a plurality of signal components transmitted by a plurality of transmission antennas and received by a plurality of reception antennas, the first channel matrix being poorly conditioned. The method further comprises constructing a second channel matrix on the basis of received samples of spectrally modified variants of signal components of the data signal being transmitted by the plurality of transmission antennas and received by the plurality of reception antennas, the second channel matrix being poorly conditioned. The method further comprises constructing a further channel matrix on the basis of the received samples of the signal components of the data signal and on the basis of parts of the received samples of the spectrally modified variants of the signal components of the data signal such that the further channel matrix is well-conditioned.

According to an embodiment, at least one of the first channel matrix and the second channel matrix is poorly conditioned. A poorly conditioned matrix is a matrix which is quasi rank-deficient, i.e. at least one eigenvalue of the matrix is close or very close to zero. A rank-deficient matrix is also considered a poorly conditioned matrix. The rank of an m×n matrix is at most min(n,m). A matrix that has a rank as large as possible is said to have full rank; otherwise, the matrix is rank-deficient. A well-conditioned matrix is a matrix which is neither rank-deficient nor quasi rank-deficient. Well-conditioned matrices may be used for matrix inversion.

In the following a specific embodiment similar to the embodiment depicted in FIG. 5 will be described in further detail. The pre-coding (convolution) sequences which are defined in the time domain are proposed to be chosen with respect to the following criteria:

The convolution sequence to be applied to TX antenna #j is typically defined by a vector containing complex elements:

$$g^{(j)} = (g_0^{(j)} g_1^{(j)} \ldots), g_n^{(j)} \in C \forall n.$$

The sequence $g^{(j)}$ is typically short, i.e. only elements $g_n^{(j)}$ with small "n" are non-zero (typically $g_{n>M}^{(j)} = 0$ with M<<N, wherein M is two orders of magnitude smaller than N, with N being the size of the OFDM symbol, e.g. N=2048 in one 3GPP LTE configuration). A more specific "shortness" condition is given below.

As a result, the receiver perceives the additional convolution as part of the overall system impulse response including the over-the-air channel impulse response convolved with the RF transmitter and receiver filter impulse responses convolved with the corresponding sequence $g^{(j)}$. $g^{(j)}$ is chosen to be short in the sense that the resulting system impulse response is still smaller compared to the OFDM guard interval (or cyclic prefix), thus no additional steps are required for taking it into account for the decoding in the receiver unit. The receiver unit does not even have to be "aware" of $g^{(k)}$ since it considers it to be part of the overall system impulse response which needs to be equalized anyhow. In 3GPP LTE, the guard interval size for the DL communication is typically 140 or 166 samples and an extended guard interval of 512 or 1024 samples can also be used, i.e. a transmitter unit convolutional pre-coding is typically lengthening the overall system impulse response irrelevantly.

Referring to FIG. 6, there is shown a diagram to illustrate the introduction of frequency diversity. As stated above, the objective of the introduction of a time domain convolution sequence is to introduce the overall frequency diversity. In FIG. 6 the frequency response is illustrated for the case of just one (strong) Line-of-Sight (LOS) component and the frequency response resulting in the combination of such a channel with a simple transmitter convolution, wherein the following convolution sequence is used: $g^{(1)} = (1\ 2)/\sqrt{5}$.

Figure 7:
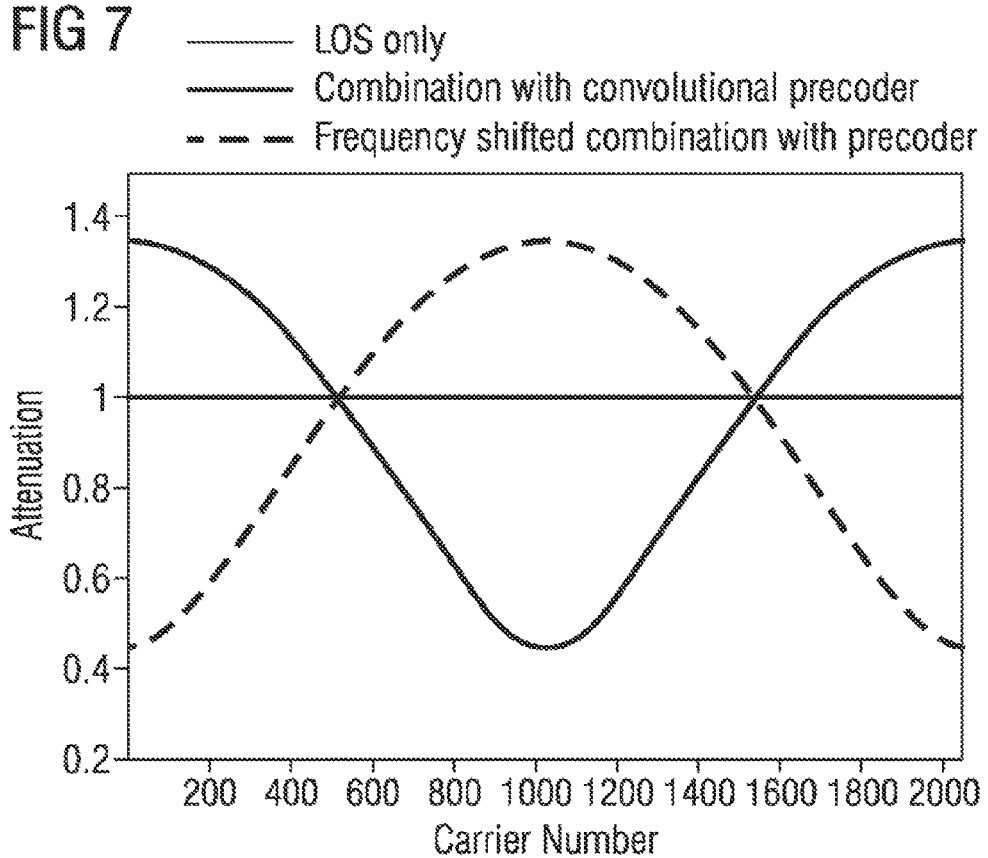
FIG. 7 shows a diagram to illustrate the introduction of frequency diversity, including a frequency shifted version of the sequence used for the second transmission.

Referring to FIG. 7, there is shown a diagram to illustrate the introduction of frequency diversity, including a frequency shifted version of the original convolutional sequence used for the first retransmission. If the message can not be decoded after the first retransmission, another retransmission is required. In this case, it is proposed that the same convolution sequences are applied as for the first retransmission with the difference that a frequency shift of this sequence is performed (in order to avoid that bits fall into "fadings" for a second time). Such a frequency domain shift is performed by applying a linear phase in the time domain, i.e. each sample number "n" is multiplied by $e^{j\alpha n}$ with α being a complex constant. A preferred solution is to choose α=π, leading to a cyclic spectral shift by half of the bandwidth.

As already indicated above, according to an embodiment it is proposed that the convolution sequences $g^{(k)}$ are specifically selected such that the respective condition of the channel matrices are improved when the received symbols of the first transmission and the received symbols of the second transmission are combined.

The MIMO communication system may be described in a frequency domain representation by assuming that $$r = Hs + z$$

wherein s is the $N_{TX} \times 1$ signal vector (in frequency domain representation) transmitted by the transmission unit which corresponds to the data signal (in frequency domain representation), r is the $N_{RX} \times 1$ signal vector (in frequency domain representation) received by the reception unit, H is the $N_{RX} \times N_{TX}$ channel matrix, and z is the $N_{RX} \times 1$ noise vector (in frequency domain representation). The $N_{TX} \times 1$ signal vector s is denominated as the data signal and the $N_{TX}$ elements of s are denominated as the signal components of the data signal. The data signal as well as the signal components of the data signal may be represented in the time domain or in the frequency domain. Reconstructing the transmitted signal vector s by the received signal vector r and by this demodulation of s may be performed by inverting the channel matrix H. Such a matrix inversion requires that H has no rank deficiencies.

We further assume that H is rank-deficient and s can not be demodulated even if s is retransmitted. It is then proposed to use an independent pre-coder/processor matrix P for the retransmission. In one exemplary embodiment the MIMO communication system is a 2×2 MIMO system wherein the transmission unit comprises two transmission antennas and the reception unit comprises two reception antennas. Of course, all mechanisms described hereinafter can be straightforwardly extended to any dimension.

Transmit #1 with a pre-coder $P_1$, so that $$r_1 = HP_1 s + z_1.$$

Transmit #2 with a pre-coder $P_2$, so that $$r_2 = HP_2 s + z_2.$$

We can thus write $$\begin{bmatrix} r_1 \\ r_2 \end{bmatrix} = \begin{bmatrix} HP_1 \\ HP_2 \end{bmatrix} s + \begin{bmatrix} z_1 \\ z_2 \end{bmatrix}$$

Then it is possible to choose $P_1, P_2$ such that all elements of s can be demodulated, namely if $$\text{rank}\left\{ \begin{bmatrix} HP_1 \\ HP_2 \end{bmatrix} \right\} \geq N_{TX}.$$

In the following example the use of a convolutional decoder is illustrated.

A 2×2 MIMO system is considered, using Spatial Division Multiplexing with two spatial streams, which means that a full-rank (i.e. rank 2) preferably well-conditioned, channel matrix $$H^{(k)}_{N_{RX} \times N_{TX}}$$

is required for each OFDM carrier "k"

$(H^{(k)}_{N_{RX} \times N_{TX}}$ contains all channel attenuation between all transmission and reception antennas).

To illustrate a worst case scenario, it is assumed that the channels between the various transmission and reception antennas are quasi-identical, e.g. due to very strong LOS (Line-of-Sight) components and corresponding positioning of the antennas. Thus, in this worst case scenario, the channel matrices would correspond to $$H^{(k)}_{N_{RX} \times N_{TX}} = \begin{bmatrix} H^{(k)}_{11} & H^{(k)}_{12} \\ H^{(k)}_{21} & H^{(k)}_{22} \end{bmatrix} = \begin{bmatrix} 1 & 1 \\ 1 & 1 \end{bmatrix} \forall k.$$

Obviously this matrix is rank deficient as only one singular value is non-zero as it can be verified by calculating the Singular-Value-Decomposition (SVD). Consequently the transmission of two spatial streams will fail for all carriers. In such a context even the transmission of redundancy information is in vain, since the symbols can not be decoded as long as the channel impulse response does not change.

In order to circumvent this problem, for each retransmission of the original data, the introduction of a small time domain convolution prior to the transmission by antenna #1 is introduced. For this example, the following normalized convolution sequence is chosen: $g^{(1)}=(1\ 2)/\sqrt{5}$. Also an OFDM symbol with 2048 carriers is assumed (following the 3GPP LTE standard). We now have two channel matrices, one for the initial transmission and one for the retransmission:

Initial transmission:

$$H^{(k)}_{N_{RX} \times N_{TX}} = \begin{bmatrix} H^{(k)}_{11} & H^{(k)}_{12} \\ H^{(k)}_{21} & H^{(k)}_{22} \end{bmatrix} = \begin{bmatrix} 1 & 1 \\ 1 & 1 \end{bmatrix} \forall k$$

1. Retransmission:

$$H^{(k),R1}_{N_{RX} \times N_{TX}} = \begin{bmatrix} c(k) \cdot H^{(k)}_{11} & H^{(k)}_{12} \\ c(k) \cdot H^{(k)}_{21} & H^{(k)}_{22} \end{bmatrix} = \begin{bmatrix} c(k) & 1 \\ c(k) & 1 \end{bmatrix} \forall k$$

where "c(k)" corresponds to the multiplicative element (in frequency domain) introduced by the convolution sequence $g^{(1)}=(1\ 2)/\sqrt{5}$ (in time domain). c(k) further corresponds to the pre-coder $G_j$ as described in FIG. 5. The convolution by $g^{(1)}=(1\ 2)/\sqrt{5}$ is performed in time domain represented by the index "n", leading to a multiplicative factor c(k) in frequency domain represented by the index "k". The calculations below are performed in frequency domain for all carriers "k" (as indicated by the channel matrix $$H^{(k)}_{N_{RX} \times N_{TX}}.$$

The multiplicative factor "c(k)" may be derived from $g^{(1)}$ by a Fourier Transformation.

It is now proposed that two received symbols are constructed based on these channel matrices, one by combining both initially received symbols plus the received symbol of the first reception antenna and another one by combining both initially received symbols plus the received symbol of the second reception antenna. This leads to new channel matrices corresponding to the two new constructed symbols:

1) new constructed matrix:

$$H^{(k),N1a}_{N_{RX} \times N_{TX}} = \begin{bmatrix} (1+c(k)) \cdot H^{(k)}_{11} & 2H^{(k)}_{12} \\ H^{(k)}_{21} & H^{(k)}_{22} \end{bmatrix} = \begin{bmatrix} 1+c(k) & 2 \\ 1 & 1 \end{bmatrix} \forall k$$

2) new constructed matrix:

$$H^{(k),N1b}_{N_{RX} \times N_{TX}} = \begin{bmatrix} H^{(k)}_{11} & H^{(k)}_{12} \\ (1+c(k)) \cdot H^{(k)}_{21} & 2H^{(k)}_{22} \end{bmatrix} = \begin{bmatrix} 1 & 1 \\ 1+c(k) & 2 \end{bmatrix} \forall k$$

The second equality of 1) and 2) is only valid if the condition $$H^{(k)}_{N_{RX} \times N_{TX}} = \begin{bmatrix} H^{(k)}_{11} & H^{(k)}_{12} \\ H^{(k)}_{21} & H^{(k)}_{22} \end{bmatrix} = \begin{bmatrix} 1 & 1 \\ 1 & 1 \end{bmatrix} \forall k$$

is met as described above.

The proposed scheme thus allows to ensure a robust communication for SDM even in the presence of highly correlated MIMO channels. In other words, it avoids the occurrence of ill-conditioned channel matrices. If further retransmissions are required, the transmitter can "randomly" adjust the convolution sequences without informing the receiver about its nature. Simply by constructing various new decoding matrices, the receiver will be able to extract the information. Those further retransmissions might be put into spatial streams/beams with a low SNR. Only a little additional energy (incremental redundancy) might be required to fully decode the packet. This can be done by properly choosing a convolutional pre-coder, i.e. the convolution sequence.

The upper formulation is quite general. In fact, the example initial transmission:

$$H^{(k)}_{N_{RX} \times N_{TX}} = \begin{bmatrix} 1 & 1 \\ 1 & 1 \end{bmatrix} \forall k,$$

and retransmission:

$$H^{(k),R1}_{N_{RX} \times N_{TX}} = \begin{bmatrix} c(k) & 1 \\ c(k) & 1 \end{bmatrix} \forall k$$

can be considered as a special case of this formulation, namely Transmit #1:

$$P_1 = \begin{bmatrix} 1 & 0 \\ 0 & 1 \end{bmatrix} \Rightarrow$$

equivalent channel $$HP_1 = \begin{bmatrix} 1 & 1 \\ 1 & 1 \end{bmatrix}$$

Transmit #2:

$$P_2 = \begin{bmatrix} c(k) & 0 \\ 0 & 1 \end{bmatrix} \Rightarrow$$

equivalent channel $$HP_2 = \begin{bmatrix} c(k) & 1 \\ c(k) & 1 \end{bmatrix}$$

when $c(k) \neq 1$, then $$\text{rank}\left\{\begin{bmatrix} HP_1 \\ HP_2 \end{bmatrix}\right\} = 2,$$

so that s can be demodulated.

Devices according to embodiments improve the system performance by increase of the channel diversity without CSI (Channel State Information) knowledge in the transmission unit. By using a pre-coding (convolutional coding) in the transmission unit the overall channel diversity is efficiently increased. The introduction of this technique does not need to be communicated to the reception unit, nor does it need to be known by the reception unit, since it is inherently taken into account by the channel decoding procedures. However, according to an embodiment the pre-coder may be designed by using CSI. By exploiting knowledge about CSI the system performance may be further improved.

Embodiments of MIMO systems as illustrated in the figures provide means on how to transform poorly conditioned and rank deficient channel matrices into well conditioned ones enabling an efficient decoding of the transmitted information. Embodiments of such MIMO systems may be combined with common MIMO techniques and HARQ processing.

For special channel $$H^{(k)}_{N_{RX} \times N_{TX}} = \begin{bmatrix} 0 & 1 \\ 0 & 1 \end{bmatrix} \forall k,$$

then $$HP_2 = \begin{bmatrix} 0 & 1 \\ 0 & 1 \end{bmatrix}$$

with $$P_2 = \begin{bmatrix} c(k) & 0 \\ 0 & 1 \end{bmatrix} \Rightarrow$$

this P2 does not work since $$\text{rank}\left\{\begin{bmatrix} HP_1 \\ HP_2 \end{bmatrix}\right\} = 1.$$

However, we can choose $$P_2 = \begin{bmatrix} c(k) & 0 \\ 0 & 1 \end{bmatrix},$$

then $$HP_2 = \begin{bmatrix} c(k) & 1 \\ c(k) & 1 \end{bmatrix}.$$

When $c(k) \neq 1$, then $$\text{rank}\left\{\begin{bmatrix} HP_1 \\ HP_2 \end{bmatrix}\right\} = 2,$$

thus s can be demodulated.

It is to be noted that the upper way of constructing the matrices $$H^{(k),N1a}_{N_{RX} \times N_{TX}} = \begin{bmatrix} (1+c(k)) \cdot H^{(k)}_{11} & 2H^{(k)}_{12} \\ H^{(k)}_{21} & H^{(k)}_{22} \end{bmatrix} = \begin{bmatrix} 1+c(k) & 2 \\ 1 & 1 \end{bmatrix} \forall k$$

$$H^{(k),N1b}_{N_{RX} \times N_{TX}} = \begin{bmatrix} H^{(k)}_{11} & H^{(k)}_{12} \\ (1+c(k)) \cdot H^{(k)}_{21} & 2H^{(k)}_{22} \end{bmatrix} = \begin{bmatrix} 1 & 1 \\ 1+c(k) & 2 \end{bmatrix} \forall k$$

requires a "suitable" c(k) selection, i.e. a "suitable" selection of the pre-coder. In particular, the rank properties are not improved if the following condition holds: (1+c(k))=2. This is in particular true, if the pre-coder is entirely omitted. But even in presence of a pre-coder, this condition should be omitted for all carriers.

The proof for the poor matrix rank improvement results is as follows: With (1+c(k))=2, the resulting matrices can be written as follows:

$$H^{(k),N1a}_{N_{RX} \times N_{TX}} = \begin{bmatrix} (1+c(k)) \cdot H^{(k)}_{11} & 2H^{(k)}_{12} \\ H^{(k)}_{21} & H^{(k)}_{22} \end{bmatrix} = \begin{bmatrix} 2 \cdot H^{(k)}_{11} & 2H^{(k)}_{12} \\ H^{(k)}_{21} & H^{(k)}_{22} \end{bmatrix} = \begin{bmatrix} 2 & 0 \\ 0 & 1 \end{bmatrix} \begin{bmatrix} H^{(k)}_{11} & 2H^{(k)}_{12} \\ H^{(k)}_{21} & H^{(k)}_{22} \end{bmatrix} \forall k$$

and $$H^{(k),N1b}_{N_{RX} \times N_{TX}} = \begin{bmatrix} H^{(k)}_{11} & H^{(k)}_{12} \\ (1+c(k) \cdot H^{(k)}_{21} & 2H^{(k)}_{22} \end{bmatrix} = \begin{bmatrix} H^{(k)}_{11} & H^{(k)}_{12} \\ 2H^{(k)}_{21} & 2H^{(k)}_{22} \end{bmatrix} = \begin{bmatrix} 1 & 0 \\ 0 & 2 \end{bmatrix} \begin{bmatrix} H^{(k)}_{11} & 2H^{(k)}_{12} \\ H^{(k)}_{21} & H^{(k)}_{22} \end{bmatrix} \forall k.$$

Due to the well-known matrix calculus rule "rank(AB)≦rank(A)" and "rank(AB)≦rank(B)" the upper steps cannot increase the rank of the original rank-deficient transmission $$H^{(k)}_{N_{RX} \times N_{TX}} = \begin{bmatrix} H^{(k)}_{11} & H^{(k)}_{12} \\ H^{(k)}_{21} & H^{(k)}_{22} \end{bmatrix} = \begin{bmatrix} 1 & 1 \\ 1 & 1 \end{bmatrix} \forall k,$$

since $$\text{rank}\left(\begin{bmatrix} 2 & 0 \\ 0 & 1 \end{bmatrix}\begin{bmatrix} H^{(k)}_{11} & H^{(k)}_{12} \\ H^{(k)}_{21} & H^{(k)}_{22} \end{bmatrix}\right) \leq \text{rank}\left(\begin{bmatrix} H^{(k)}_{11} & H^{(k)}_{12} \\ H^{(k)}_{21} & H^{(k)}_{22} \end{bmatrix}\right)$$

and $$\text{rank}\left(\begin{bmatrix} 1 & 0 \\ 0 & 2 \end{bmatrix}\begin{bmatrix} H^{(k)}_{11} & H^{(k)}_{12} \\ H^{(k)}_{21} & H^{(k)}_{22} \end{bmatrix}\right) \leq \text{rank}\left(\begin{bmatrix} H^{(k)}_{11} & H^{(k)}_{12} \\ H^{(k)}_{21} & H^{(k)}_{22} \end{bmatrix}\right).$$

While the optimum solution requires the knowledge of the channel and thus an information exchange prior to the usage of the method, a simplified version can be implemented by the vendor for HARQ chase-combining: With every retransmission any predetermined convolutional pre-coder may be employed without notification of the receiver. If the receiver is aware of the proposed mechanisms, it can improve the link characteristics following our proposals in this application. If the receiver is unaware (e.g. competitor's product), the standard decoding approaches will work since the pre-coder is "hidden" in the overall system impulse response.

In general, the following should be considered for selection of the convolutional pre-coders in the optimum case, i.e. channel characteristics are known at transmitter.

Pre-coder $P_2$ at retransmission should be chosen (e.g. orthogonal to $P_1$) such that the resulting compound pre-coder-channel matrix, possibly independent of the real channel, has the highest/higher rank.

In order to achieve a), the convolutional pre-coder needs to be designed jointly for all transmission antennas, not separately for individual antennas.

The convolutional pre-coder is a linear pre-coder. It should therefore be possible to define a good convolutional pre-coder, depending on the channel, as well as the receiver.

Figure 8:
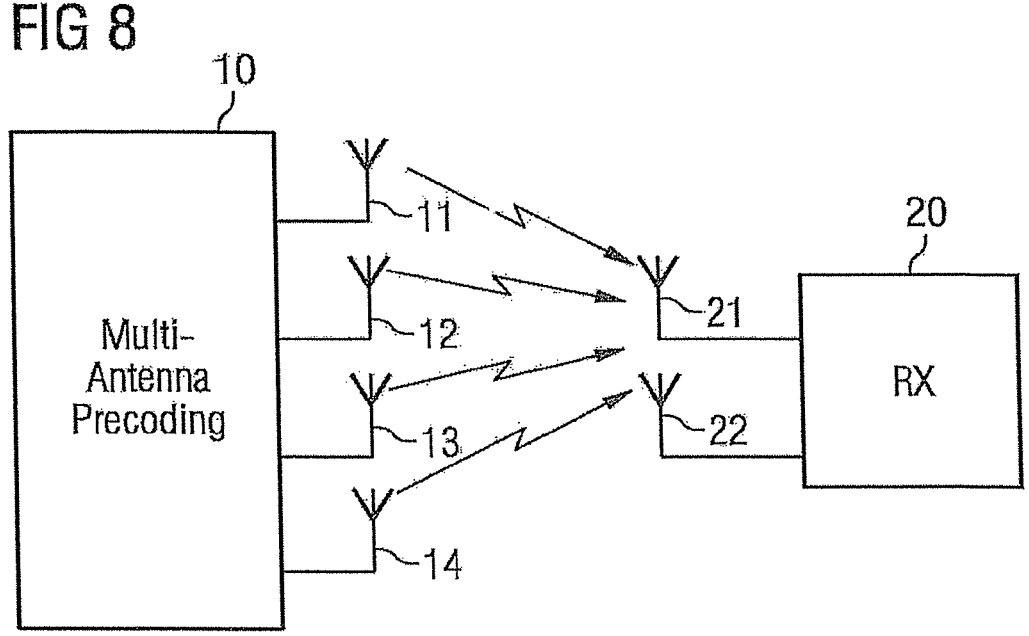
FIG. 8 shows a schematic block representation of a wireless MIMO system according to an embodiment.

Referring to FIG. 8, there is shown a schematic block presentation of a MIMO system in a generalized form. The MIMO system comprises a transmission unit 10 having a plurality of transmission antennas 11 to 14, and a reception unit 20 having a plurality of reception antennas 21 and 22. There are also shown some but not all of the spatial beams from the transmission antennas 11 to 14 to the reception antennas 21 and 22.

Figure 9:
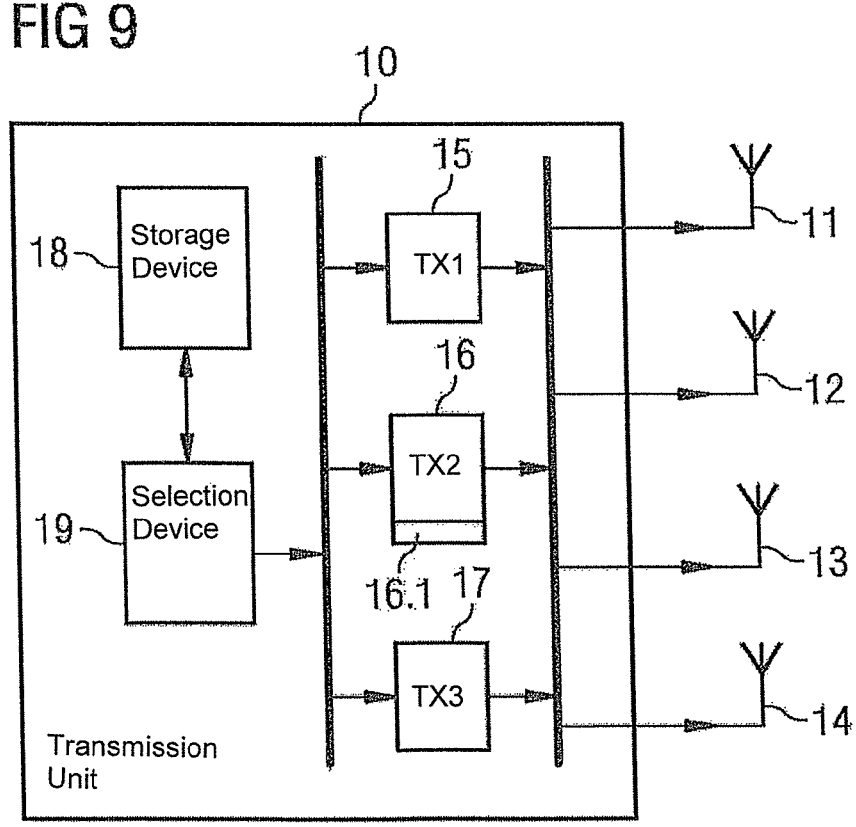
FIG. 9 shows a schematic block representation of a transmission unit according to an embodiment.

Referring to FIG. 9, there is shown a schematic block presentation of a transmission unit to transmit a data signal, in particular an orthogonal frequency division multiplex (OFDM) signal. The transmission unit 10 comprises a plurality of antennas 11, 12, 13, and 14, a first transmission device (TX1) 15 to perform a first transmission of a data signal, the first transmission comprising transmitting the data signal by the plurality of transmission antennas 11 to 14, and a second trans-mission device (TX2) 16 to perform a second transmission of the data signal at a time later than the first transmission, the second transmission comprising transmitting signal variants of the data signal by at least one antenna of the plurality of transmission antennas 11 to 14, wherein the second transmission device 16 comprises a pre-coding device (PCD) 16.1 to pre-code the data signal with a respective convolutional sequence to obtain a respective signal variant.

According to an embodiment of the transmission unit 10 of FIG. 9, the transmission unit 10 further comprises a third transmission device (TX3) 17 to perform a third transmission of the data signal at a time later than the second transmission, the third transmission comprising transmitting spectrally modified signal variants of the data signal. According to an embodiment thereof, the third transmission device 17 is arranged to initiate the third transmission upon receipt of an information that the transmitted data signal could not be correctly decoded on the basis of the first and second transmissions. According to an embodiment, the third transmission device 17 is arranged to perform a third transmission which is similar or equal to the second transmission. According to an alternative embodiment, the third transmission device 17 is arranged to perform a third transmission which is different to the second transmission. In particular, the third transmission device 17 is arranged to perform a third transmission, the signal variants thereof are obtained by frequency shifting the signal variants of the second transmission. In particular, the signal variants of the third transmission are obtained by applying a linear phase in time domain to each sample value of the signal variants of the second transmission by multiplying each sample value by $e^{j\alpha n}$, where $\alpha$ is a complex constant and n is the sample number, wherein $\alpha$ can be equal to $\pi$.

According to an embodiment of the transmission unit 10 of FIG. 9, the transmission 10 further comprises a storage device 18 to store a plurality of pre-coders, wherein each pre-coder comprises information on spectrally modified signal variants of a second or third transmission.

According to an embodiment of the transmission unit 10 of FIG. 9, the transmission unit 10 further comprises a selection device 19 to select a pre-coder for performing a second or third transmission. According to an embodiment thereof, the selection device 19 is arranged to specifically select a particular pre-coder on the basis of an information about the channel in form of the channel matrix. The selection device 19 can also be arranged to accidentally select an arbitrary decoder.

Further embodiments of the transmission unit 10 of FIG. 9 can be constructed in which the devices of the transmission unit 10 are arranged to perform operations as described above in connection with a method for transmitting a data signal according to FIG. 1 or 2.

According to further embodiments of the transmission unit 10 of FIG. 9, the devices of the transmission unit 10 can be either implemented as hardware elements or as software tools within a processor like a digital signal processor (DSP). It is also possible that part of the devices can be implemented has hardware elements and the other part can be implemented has software tools.

Figure 10:
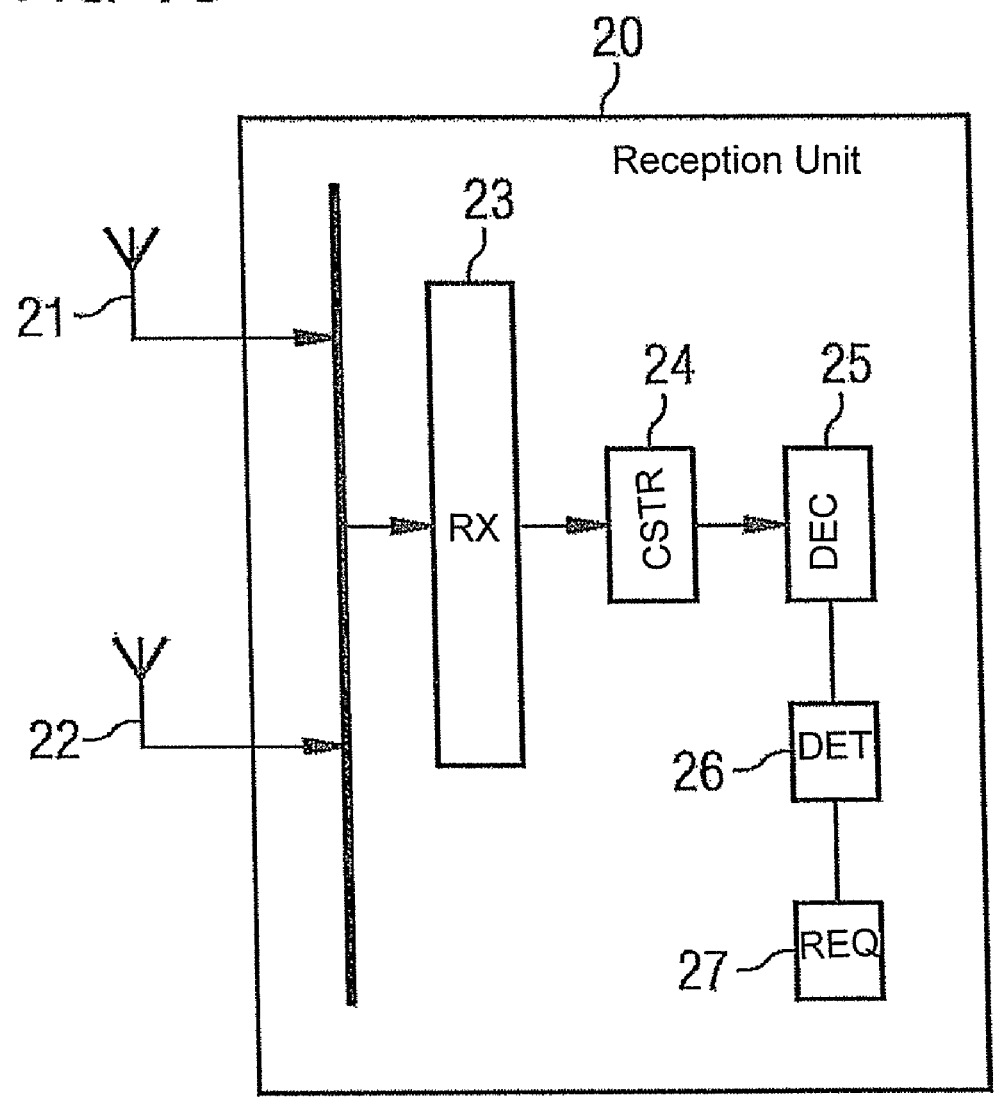
FIG. 10 shows a schematic block representation of a reception unit according to an embodiment.

Referring to FIG. 10, there is shown a schematic block representation of a reception unit 20 to receive a data signal, in particular an orthogonal frequency division multiplex (OFDM) signal. The reception unit 20 comprises a plurality of antennas 21 and 22, a reception device (RX) 23 to receive a first transmission of a data signal and a second transmission of the data signal, wherein the first transmission is represented by a first channel matrix and the second transmission comprises spectrally modified signal variants of the data signal and is represented by a second channel matrix, a construction device (CSTR) 24 to construct a further channel matrix on the basis of the second channel matrix, the further channel matrix comprising a rank which is higher than the rank of the first channel matrix, and a decoding device (DEC) 25 to decode the transmitted data signal by means of the further channel matrix.

According to an embodiment of the reception unit 20 of FIG. 10, the reception unit 20 further comprises a detection device (DET) 26 to detect that the transmitted data signal can not be correctly decoded on the basis of the first transmission, and a request device (REQ) 27 to request the second transmission, the request device 27 coupled to the detection device 20. According to an embodiment thereof, the detection device 20 is arranged to operate on the basis of error-detection information bits added to the transmitted data, in particular in connection with cyclic redundancy check (CRC). According to a further embodiment, the detection device 26 is arranged to operate on the basis of both error-detection information bits and forward error correction bits added to the error-detection bits.

Further embodiments of the reception unit 20 can be constructed in which the devices of the reception unit 20 are arranged to perform operations as were described above in connection with the method for receiving an OFDM signal according to signal 2.

What is claimed is:

1. A method for transmitting a data signal by a transmission unit of a wireless multiple-input/multiple-output (MIMO) communication system, the transmission unit comprising a plurality of transmission antennas, the method comprising:
performing a first transmission of a data signal, the first transmission comprising transmitting the data signal by each one of the plurality of transmission antennas; and
performing a second transmission of the data signal at a time later than the first transmission, the second transmission comprising transmitting at least one spectrally modified signal variant of the data signal by at least one antenna of the plurality of transmission antennas,
wherein transmitting at least one spectrally modified signal variant of the data signal comprises applying a convolutional coding represented by a convolutional sequence having a plurality of non-zero elements to a signal component of the data signal to spectrally modify the data signal to obtain a respective spectrally modified signal variant of the data signal.

2. The method according to claim 1, wherein the data signal is an orthogonal frequency division multiplex (OFDM) signal.

3. The method according to claim 1, wherein the data signal comprises a plurality of signal components, and wherein the second transmission of each signal component of the data signal is spectrally modified to obtain a respective spectrally modified signal variant of the data signal.

4. The method according to claim 1, wherein the data signal comprises an OFDM signal of wherein a length of a convolutional sequence is shorter than an OFDM guard interval.

5. The method according to claim 1, wherein the first transmission is represented by a first channel matrix and the second transmission is represented by a second channel matrix, the method further comprising: selecting the convolutional sequences such that a further channel matrix is constructed based on the second channel matrix, the further channel matrix comprising a rank that is higher than a rank of the first channel matrix.

6. The method according to claim 5, wherein the convolutional sequences are selected in order to maximize a rank of the further channel matrix.

7. The method according to claim 1, wherein one of the following transmits spectrally modified signal components:
one antenna of the plurality of antennas,
all antennas of the plurality of antennas, of
any number of antennas between one and all of the plurality of antennas.

8. The method according to claim 1, wherein the spectrally modified signal variants of the data signal are different from each other.

9. The method according to claim 1, wherein the second transmission is initiated upon receipt of an information that the transmitted data signal could not be correctly decoded on the basis of the first transmission.

10. The method according to claim 1, further comprising:
performing a third transmission of the data signal at a time later than the second transmission, the third transmission comprising transmitting spectrally modified variants of the data signal.

11. The method according to claim 10, wherein the third transmission is initiated upon receipt of an information that the transmitted data signal could not be correctly decoded on the basis of the first and second transmissions.

12. The method according to claim 11, wherein the spectrally modified signal variants of the third transmission are obtained by frequency shifting the spectrally modified signal variants of the second transmission.

13. The method according to claim 1, wherein the transmission unit comprises a plurality of stored pre-coders, wherein each pre-coder comprises information on spectrally modified signal variants of a second or third transmission, the method further comprising:
arbitrarily selecting one of the plurality of stored pre-coders for performing the second or third transmission.

14. The method according to claim 1, wherein the transmission unit comprises a plurality of stored pre-coders, wherein each pre-coder comprises information on spectrally modified signal variants of a second or third transmission, the method further comprising:
specifically selecting one particular pre-coder out of the plurality of stored pre-coders for performing the second or third transmission.

15. A method for receiving a data signal by a reception unit of a wireless multiple-input/multiple-output (MIMO) communication system, the reception unit comprising a plurality of reception antennas the method comprising:
receiving a first transmission of a data signal, the first transmission being represented by a first channel matrix;
receiving a second transmission of the data signal at a time later than the first transmission, the second transmission comprising spectrally modified signal variants of the data signal and being represented by a second channel matrix, and wherein at least one spectrally modified signal variant of the data signal comprises a convolutional coding represented by a convolutional sequence having a plurality of non-zero elements to a signal component of the data signal to spectrally modify the data signal to obtain a respective spectrally modified signal variant of the data signal;
constructing a further channel matrix based on the second channel matrix, the further channel matrix comprising a rank that is higher than a rank of the first channel matrix; and
decoding the data signal by means of the further channel matrix.

16. The method according to claim 15, further comprising:
constructing the further channel matrix based on the first channel matrix and the second channel matrix.

17. The method according to claim 15, further comprising:
requesting the second transmission after detecting that the transmitted data signal can not be correctly decoded on the basis of the first transmission.

18. A transmission unit to transmit a data signal, comprising:
a plurality of antennas;
a first transmission device configured to perform a first transmission of a data signal, the first transmission comprising transmitting the data signal by each one of the plurality of transmission antennas; and a second transmission device configured to perform a second transmission of the data signal at a time later than the first transmission, the second transmission comprising transmitting at least one spectrally modified signal variant of the data signal by at least one antenna of the plurality of transmission antennas, wherein transmitting at least one spectrally modified signal variant of the data signal comprises applying a convolutional coding represented by a convolutional sequence having a plurality of non-zero elements to a signal component of the data signal to spectrally modify the data signal to obtain a respective spectrally modified signal variant of the data signal.

19. The transmission unit according to claim 18, further comprising:
a third transmission device configured to perform a third transmission of the data signal at a time later than the second transmission, the third transmission comprising transmitting spectrally modified signal variants of the data signal.

20. A reception unit to receive a data signal, comprising:
a plurality of antennas;
a reception device configured to receive a first transmission of the data signal and a second transmission of the data signal, wherein the first transmission is represented by a first channel matrix and the second transmission comprises spectrally modified signal variants of the data signal and is represented by a second channel matrix, and wherein at least one spectrally modified signal variant of the data signal comprises a convolutional coding represented by a convolutional sequence having a plurality of non-zero elements to a signal component of the data signal to spectrally modify the data signal to obtain a respective spectrally modified signal variant of the data signal;
a construction device configured to construct a further channel matrix based on the second channel matrix, the further channel matrix comprising a rank that is higher than the rank of the first channel matrix; and
a decoding device configured to decode the transmitted data signal by means of the further channel matrix.

21. A method for transmitting a data signal by a transmission unit of a wireless multiple-input/multiple-output (MIMO) communication system, the transmission unit comprising a plurality of transmission antennas, the method comprising:
performing a first transmission of the data signal by the plurality of transmission antennas, the data signal comprising a plurality of signal components, each transmission antenna transmitting a respective signal component of the data signal;
selecting a subset of the plurality of transmission antennas to obtain selected transmission antennas which are transmission antennas belonging to the subset of the plurality of transmission antennas, and to obtain non-selected transmission antennas which are transmission antennas not belonging to the subset of the plurality of transmission antennas;
pre-coding each of the signal components of the data signal transmitted by the selected transmission antennas with a respective pre-coding sequence comprising a plurality of non-zero elements to obtain spectrally modified variants of the signal components of the data signal;
performing a second transmission of the data signal at a time later than the first transmission, the second transmission comprising transmitting by the selected transmission antennas the spectrally modified variants of the signal components of the data signal and re-transmitting by the non-selected transmission antennas the signal components of the data signal transmitted by the non-selected transmission antennas.

22. A method for constructing a well-conditioned further channel matrix from a poorly conditioned first channel matrix and parts of a second poorly conditioned channel matrix comprising:
constructing a first channel matrix based on received samples of a data signal comprising a plurality of signal components transmitted by a plurality of transmission antennas and received by a plurality of reception antennas, the first channel matrix being poorly conditioned;
constructing a second channel matrix based on received samples of spectrally modified variants of signal components of the data signal being transmitted by the plurality of transmission antennas and received by the plurality of reception antennas, the second channel matrix being poorly conditioned, and wherein at least one spectrally modified signal variant of a signal component of the data signal comprises a convolutional coding represented by a convolutional sequence having a plurality of non-zero elements to a signal component of the data signal to spectrally modify the data signal to obtain a respective spectrally modified signal variant of the data signal;
constructing a further channel matrix based on the received samples of the signal components of the data signal and based on parts of the received samples of the spectrally modified variants of the signal components of the data signal such that the further channel matrix is well-conditioned.

23. The method according to claim 22, wherein the further channel matrix is constructed by combining the received samples of the signal components of the data signal with the received samples of the spectrally modified variants of the signal components of the data signal received by one of the reception antennas.

* * * * *